Dec. 27, 1932. L. DUFOUR 1,892,485
REVERSIBLE ROTARY PLOW
Filed Feb. 1, 1932

Inventor
Léon Dufour
By E. F. Wenderoth, Atty.

Patented Dec. 27, 1932

1,892,485

UNITED STATES PATENT OFFICE

LÉON DUFOUR, OF VERSOIX NEAR GENEVA, SWITZERLAND

REVERSIBLE ROTARY PLOW

Application filed February 1, 1932, Serial No. 590,230, and in France October 7, 1931.

Rotary plows having a motor driven toothed concave disc forming the tool have already been proposed and made, the disc cutting the furrow while the motor also causes the plow to move forward.

The object of the present invention is to render such a plow reversible. The invention consists in arranging the disc so that it can be swung or pivoted about an axis of symmetry so that its concavity can be turned to the left or to the right, its direction of rotation being at the same time reversed by means of a special mechanism so that in its two positions its direction of rotation remains the same as that of the traction wheels of the plow.

Both edges of the teeth of the disc are cutting edges and are preferably symmetrical because the two edges cut the earth in turn corresponding with the two respective positions of the disc.

The accompanying drawing shows diagrammatically and by way of example, some embodiments of the invention.

Figure 1:
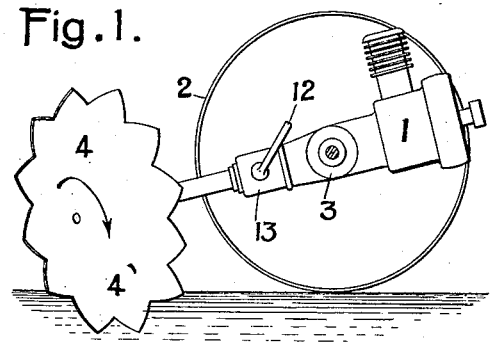
Figures 1 to 3 show one possible construction of the reversible rotary plow.
Figure 2:
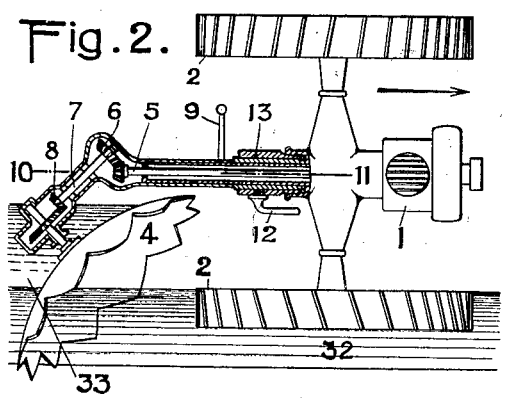
Figure 3:
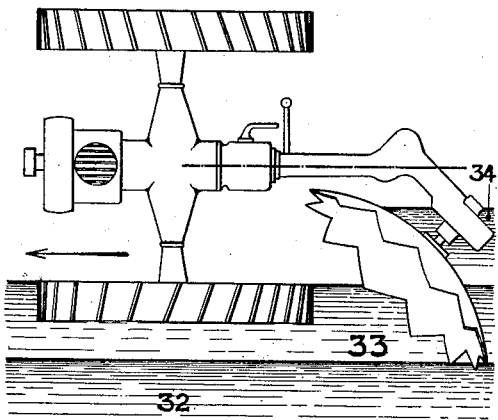

Referring to Figures 1, 2 and 3 of the drawing, 1 is a drive motor which is connected to the traction wheels 2 of the plow through an intermediate gear mechanism not shown contained in the frame box 3. The motor 1 is also connected to the toothed concaved disc 4 forming the tool to rotate it about its axis. This connection is realized by means of a longitudinal shaft 5 (Fig. 2), a pair of toothed wheels 6, an oblique shaft 7 and a second pair of toothed wheels 8 of which one wheel is fastened to the axis of the tool disc 4. The shafts 5 and 7 are located within a convenient housing containing the necessary bearings therefor.

The tool disc 4 carries peripheral teeth 4' of symmetrical form having on both sides cutting edges. The housing containing the shafts 5 and 7 and the toothed wheel pairs 6, 8 is so arranged on a tubular part of the frame box of the plow that it can be turned thereon about the axis of symmetry 10—11 which is coaxial with the shaft 5. To this end the said housing is provided with a turning-over lever 9, the actuation of which allows the tool disc 4 to be swung over about said axis of symmetry 10—11. A setting screw or lock can be provided to hold said rotatable housing in its two extreme working positions. In a part 13 of the frame box of the plow there is arranged a reversing gear mechanism interposed between the motor 1 and the shaft 5 and controlled by a shiftable hand lever 12, the hand operated member of which is arranged to serve at the same time as setting screw, said reversing gear allowing reversal of the direction of rotation of the shaft 5 and consequently of the tool disc 4, without affecting the drive of the traction wheels 2. This reversing gear mechanism may be of any known construction, two embodiments being described hereinafter.

The tool disc 4 has its concavity turned towards the right when looking in the direction of the travelling of the plow as indicated by the arrow in Figure 2, the tool disc 4 rotating in the direction of the arrow indicated in Figure 1.

Figure 3 shows the same plow in plan view returning, as indicated by the arrow in this figure, in the opposite direction to Figure 2. The disc 4 having been swung over about the axis of symmetry 10—11 is now turned to the left, looking in the direction of travel of the plow, and the disc continues to rotate in the same direction as the traction wheels as its direction of rotation has been reversed through the reversing gear contained in the box 13 and controlled by the lever 12.

It will be seen in Figure 2 that the right hand wheel of the plow follows the bottom of a furrow 32 made by the preceding passage of the plow. The disc 4 cuts a new furrow 33 adjacent to furrow 32. In Figure 3 on the return, the left hand wheel of the plow follows the furrow 33 which has just been made while the disc 4 cuts a new furrow 34 adjacent.

Figure 4:
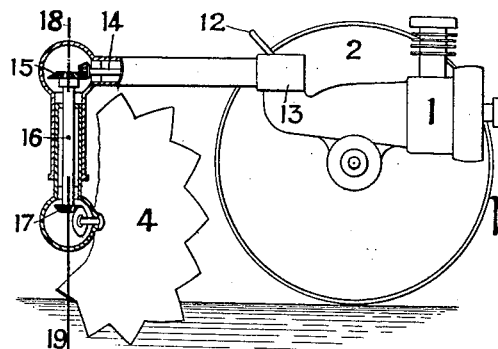
Figures 4 to 6 show another arrangement of the plow.
Figure 5:
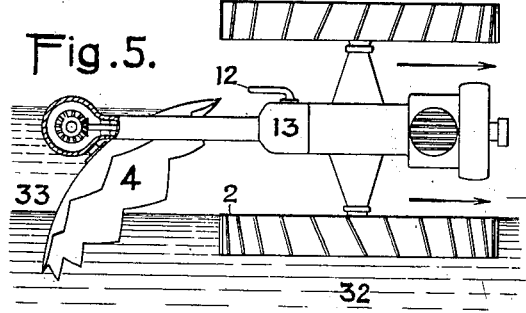
Figure 6:
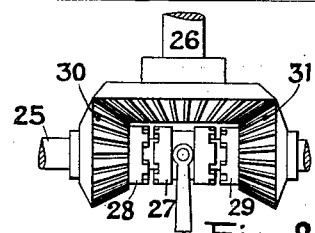

In the embodiment represented by Figures 4, 5 and 6, the motor 1 driving the traction wheels 2 is connected to the toothed concave disc 4 forming the tool by means of a longitudinal shaft 14, a pair of toothed wheels 15, a vertical shaft 16 and a pair of toothed wheels 17, all enclosed in a bent housing attached to the frame box of the plow. The upright arm of this housing is formed of two parts one of which carrying the disc 4 can be rotated with respect to the other about the axis of symmetry 18—19 being at the same time the axis of rotation of the vertical shaft 16, this arrangement allowing the disc 4 to be swung or rotated around said axis to its convenient working position with respect to the direction of travelling of the plow. The part 13 of the frame box contains a reversal gear mechanism as in the first example to allow reversal of the direction of rotation of the shaft 14 and consequently of the tool disc 4.

According to Figure 5, the plow travels to the right, the disc having its concavity turned to the right. According to Figure 6, the plow is on its return, the concavity of the disc being turned to the left. In both cases, however, the disc is caused to rotate in the same direction as the traction wheels of the plow, owing to the reversing gear mechanism contained in the box part 13.

In Figures 5 and 6 the furrows followed by the wheels and cut by the disc 4 have the same reference numerals as the corresponding furrows in Figures 2 and 3.

Figure 7:
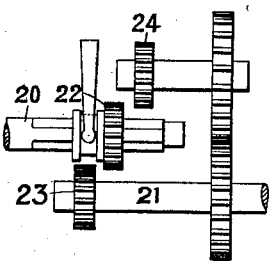
Figures 7 and 8 show on a larger scale two types of reversing mechanism which can be used for the disc.

Figure 7 shows one form of the reversing gear referred to above, of a type usual in motor vehicles. The driving shaft 20 turns the driven shaft 21 in one direction when the pinions 22 and 23 are in mesh and in the opposite direction when the pinions 22 and 24 are in mesh.

Figure 8:
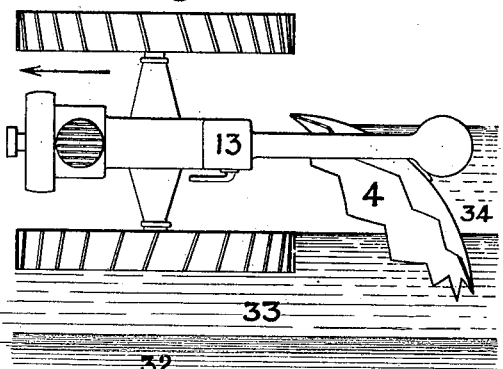

Figure 8 shows another type of reversing gear with bevel wheels 30, 31. The driving shaft 25 turns the driven shaft 26 in one direction when the dog clutch 27 is meshed with the dogs 29 and in the opposite direction when the dog clutch 27 is meshed with the dogs 28.

It is clear that the dog clutch must always be driven by the shaft 25 as by means of keys or splines, while the dogs 28 and 29 are on the respective bevel wheels 30 and 31 loose on the shaft 25.

It is possible to conceive other arrangements of the disc and its operating and reversing gear, but the examples shown in Figures 1 to 8 will suffice to enable the invention to be properly understood.

What I claim is:—

1. A reversible rotary plow comprising in combination a motor, a rotary toothed concave cutting disc, interconnecting means between the motor and the cutting disc, movable cutting disc supporting means so arranged as to allow positioning of the cutting disc with its concavity turned either to the right or to the left, said interconnecting means including a reversing mechanism to produce inversion of the direction of rotation of the cutting disc when the latter is positioned to have its concavity turned either to the right or to the left.

2. A reversible rotary plow comprising in combination a motor, a rotary concave cutting disc having peripheral teeth with symmetrical cutting edges, interconnecting means between the motor and the cutting disc, means for supporting the cutting disc so as to allow same to be swung or turned over about an axis of symmetry and to have its concavity turned either to the right or to the left, said interconnecting means including a reversing mechanism to produce inversion of the direction of rotation of the cutting disc when the latter is swung or turned over.

In witness whereof I have hereunto signed my name this 20th day of January, 1932.

LÉON DUFOUR.